(12) United States Patent  
Ono

(10) Patent No.: US 7,219,773 B2
(45) Date of Patent: May 22, 2007

(54) DISC BRAKE FOR VEHICLE

(75) Inventor: Takashi Ono, Nagano (JP)

(73) Assignee: Nissin Kogyo Co., Ltd., Nagano-ken (JP)

( * ) Notice: Subject to any disclaimer, the term of this patent is extended or adjusted under 35 U.S.C. 154(b) by 0 days.

(21) Appl. No.: 10/759,104

(22) Filed: Jan. 20, 2004

(65) Prior Publication Data
US 2004/0144602 A1    Jul. 29, 2004

(30) Foreign Application Priority Data
Jan. 20, 2003  (JP) ............. P.2003-011041
Jan. 20, 2003  (JP) ............. P.2003-011042

(51) Int. Cl.
*F16D 65/40*   (2006.01)
(52) U.S. Cl. ................. 188/73.38; 188/250 E
(58) Field of Classification Search ........... 188/73.31, 188/73.35, 73.36, 73.37, 73.38, 250 D, 250 E, 188/250 F, 250 G, 73.36 X
See application file for complete search history.

(56) References Cited
U.S. PATENT DOCUMENTS 5,377,790 A * 1/1995 Tsuruta .................... 188/73.38
5,381,875 A * 1/1995 Tsuruta et al. ........... 188/73.38
5,472,067 A * 12/1995 Fujiwara .................. 188/73.36
5,687,817 A * 11/1997 Kobayashi et al. ........ 188/72.3
5,699,882 A * 12/1997 Ikegami et al. .......... 188/73.38
5,934,417 A * 8/1999 Kobayashi et al. ........ 188/72.3
5,947,233 A * 9/1999 Kobayashi et al. ........ 188/72.3

FOREIGN PATENT DOCUMENTS

JP        56-129624      10/1981
JP          56129624    * 10/1981

* cited by examiner

*Primary Examiner*—Devon Kramer
(74) *Attorney, Agent, or Firm*—Greenblum & Bernstein, P.L.C.

(57) ABSTRACT

A disc brake for a vehicle has a caliper bracket fixed to a vehicle body, a pair of caliper support arms striding an outer periphery of a disc rotor in a disc axial direction, pad guide grooves formed in the caliper support arms so as to be opposed to each other, friction pads disposed on both sides of the disc rotor, the friction pads having ears projected from both side portions of a back plate thereof, and pad retainers disposed on the pad guide grooves, the ears of the friction pads being movably supported by the pad guide grooves via the pad retainers, wherein pad retainers each has pad returning portions for urging the friction pads away from the disc rotor.

22 Claims, 15 Drawing Sheets

DISC BRAKE FOR VEHICLE

BACKGROUND OF THE INVENTION

1. Field of the Invention

The present invention relates to a disc brake for a vehicle that is used in vehicles such as automobiles and motorcycles. More specifically, the invention relates to the structure of pad retainers that are set in pad guide grooves of caliper support arms and movably support ears of back plates of friction pads.

2. Description of the Related Art

In general, in conventional disc brakes in which friction pads are hung and held so as to be movable in the disc axial direction in such a manner that ears projecting from both side portions of back plates of the friction pads are movably supported by pad guide grooves that are formed in caliper support arms of a caliper bracket, pad retainers made of a metal thin plate are interposed between the pad guide grooves and the ears. Each pad retainer is formed with pad returning mechanisms that are brought in contact with the disc-rotor-entrance-side and exit-side side faces of the ears and urge the ears parallel with the disc axial direction away from the disc rotor. In a non-braking state, the pad returning mechanisms (pad springing-back portions) forcibly return the friction pads from the disc rotor, whereby dragging of the friction pads and juddering that is caused by wear of the disc rotor are prevented and brake noise is reduced (refer to JP-UM-A-56-129624, for example).

However, with the above configuration in which the pad returning mechanisms urge the friction pads away from the disc rotor, in tentatively attaching the friction pads to the pad guide grooves of the caliper support arms, the friction pads are pushed away from the disc rotor and may fall off the caliper support arms. As a result, the attachment work takes much time.

Although as described above the pad retainers having the above structure have the effect of returning the friction pads from the disc rotor in a non-braking state, they cannot prevent the ears from playing in the disc radial direction inside the pad guide grooves. Further, since the friction pads are always urged away from the disc rotor by the pad springing-back portions, the friction pads are prone to fall off a caliper bracket in attaching the friction pads to the caliper bracket tentatively. The attachment work thus takes much time.

SUMMARY OF THE INVENTION

An object of the present invention is therefore to provide a disc brake for a vehicle capable of preventing friction pads from falling off a caliper bracket in tentatively attaching the friction pads to caliper support arms of the caliper bracket and thereby increasing the ease of attachment.

An another object of the present invention is therefore to provide a disc brake for a vehicle in which pad springing-back portions are solely able to not only return friction pads but also effectively prevent play of ears to thereby reduce brake noise and suppress juddering caused by wear of a disc rotor and effectively prevent generation of a friction pad striking sound due to play of the ears and further the pad springing-back portions are solely able to prevent the friction pads from falling off a caliper bracket in attaching the friction pads to the caliper bracket tentatively to thereby allow the friction pads to be attached easily.

To attain the above object, the present invention provides a disc brake for a vehicle having: a caliper bracket fixed to a vehicle body; a pair of caliper support arms striding an outer periphery of a disc rotor in a disc axial direction; pad guide grooves formed in the caliper support arms so as to be opposed to each other; friction pads disposed on both sides of the disc rotor, the friction pads having ears projected from both side portions of a back plate thereof, and pad retainers disposed on the pad guide grooves, the ears of the friction pads being movably supported by the pad guide grooves via the pad retainers, wherein pad retainers each has pad returning portions for urging the friction pads away from the disc rotor.

The pad returning portions may include: an elastic loop portion formed by a long and narrow piece outwardly extended away from the disc rotor in the disc axial direction and bent back to the disc rotor in the disc axial direction; and a pad springing-back portion formed by the long and narrow piece further extended toward the disc rotor and outwardly inclined in a disc radial direction.

The long and narrow piece of the elastic loop portion may be bent back so as to form a circular arc, and the long and narrow piece of the pad springing-back portion may be warped as a shape of a curvature.

The pad guide grooves may be formed by bracket-shaped grooves each having a disc radial direction outer side face, a disc radial direction inner side face, and an opposed face connecting the two side faces.

The pad retainer may include: a receiving piece contacted with the disc radial direction inner side face and a long and narrow piece extended from the receiving piece away from the disc rotor, a proximal portion of the long and narrow piece may be bent back toward the disc rotor in circular arc form to form an elastic loop portion, a tip portion of the long and narrow piece that extends from the elastic loop portion toward the disc rotor may be outwardly inclined in the disc radial direction to form a pad springing-back portion, and wherein the pad springing-back portion may be contacted with a disc radial direction inner side face of the ear to urge the ear away from the disc rotor and outward in the disc radial direction.

The pad springing-back portion may be warped as a shape of a curvature as it extends from the proximal portion.

The elastic loop portion may be located on an opposite side of the ear to the disc rotor.

The pad retainer may include pad falling-off preventive portions projected on opposite sides of the ears to the disc rotor.

The elastic loop portion may be a pad falling-off preventive portion.

DETAILED DESCRIPTION OF THE PREFERRED EMBODIMENTS

Figure 1:
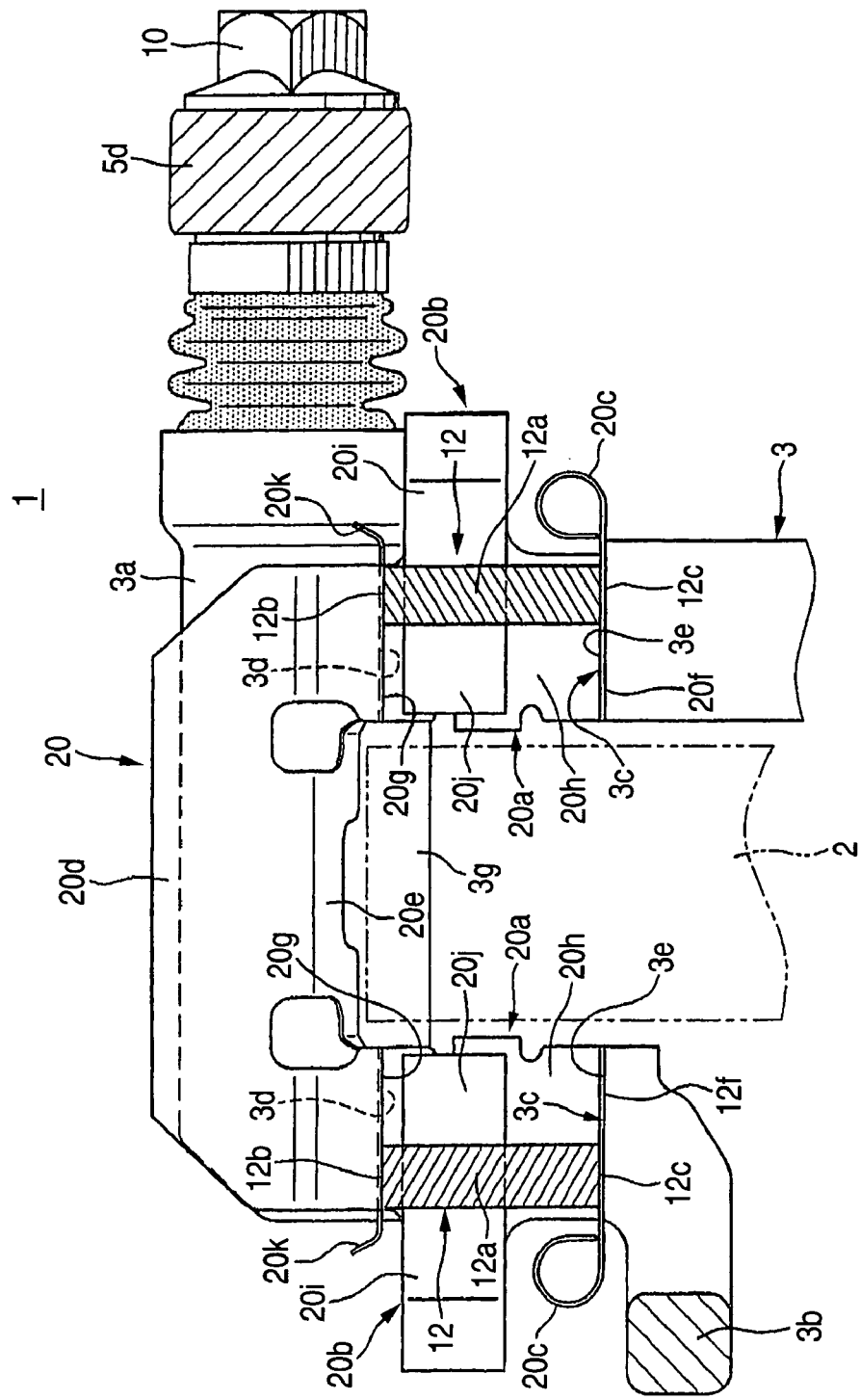
FIG. 1 is a sectional view taken along line I—I in FIG. 7.
Figure 2:
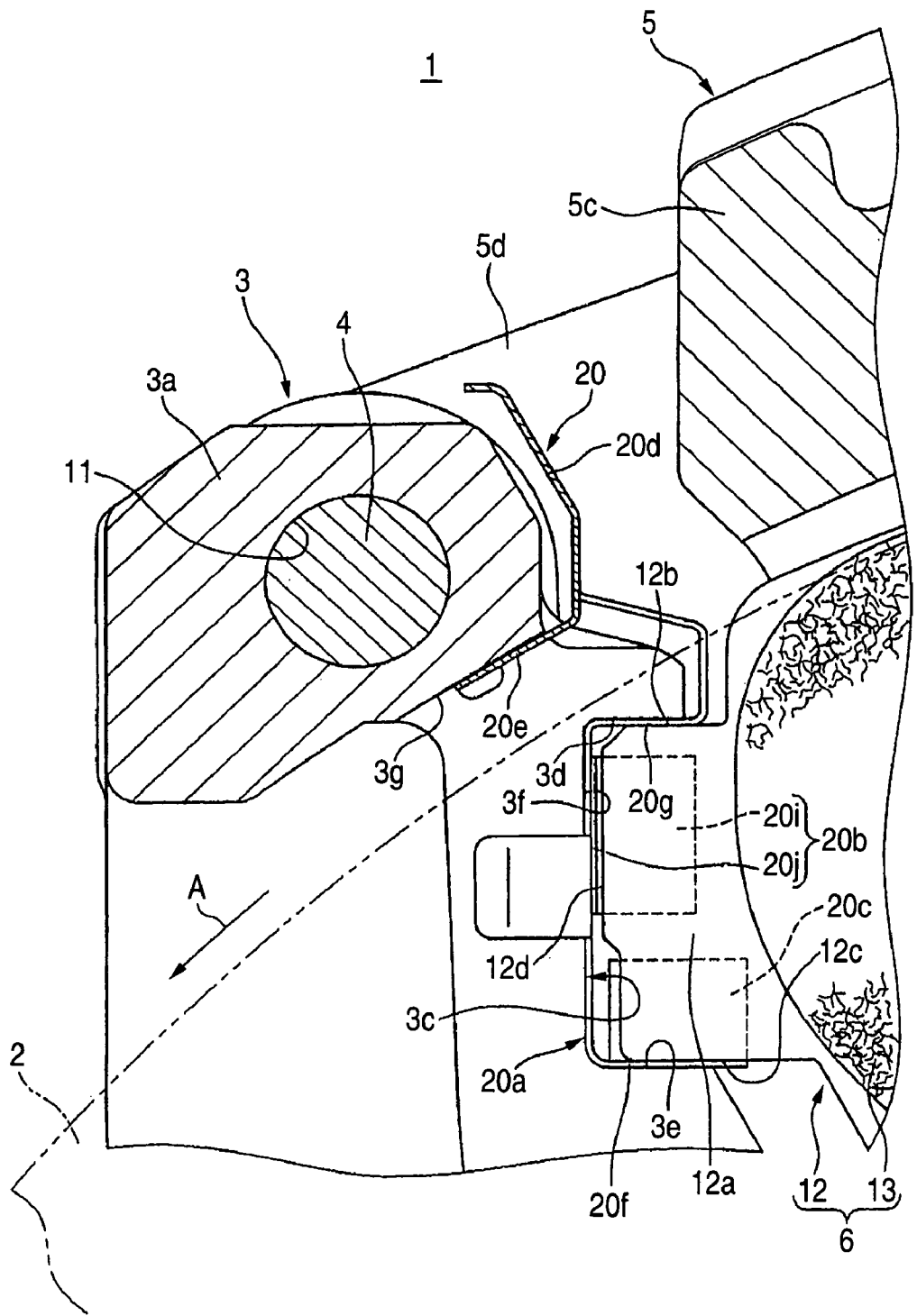
FIG. 2 is a rear sectional view of an important part of a disc brake according to a first embodiment of the present invention.
Figure 3:
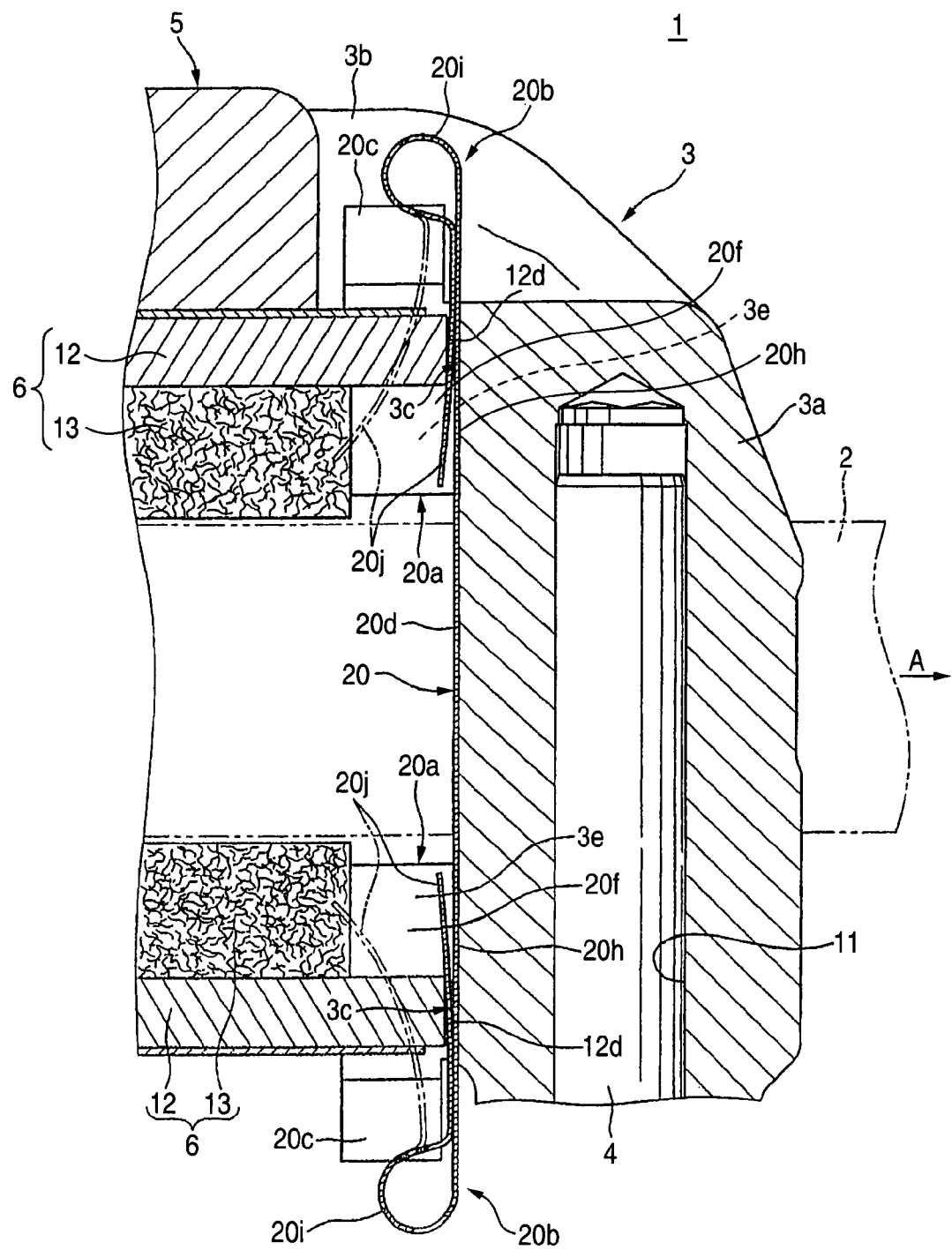
FIG. 3 is a plan sectional view of an important part of the disc brake according to the first embodiment of the invention.
Figure 4:
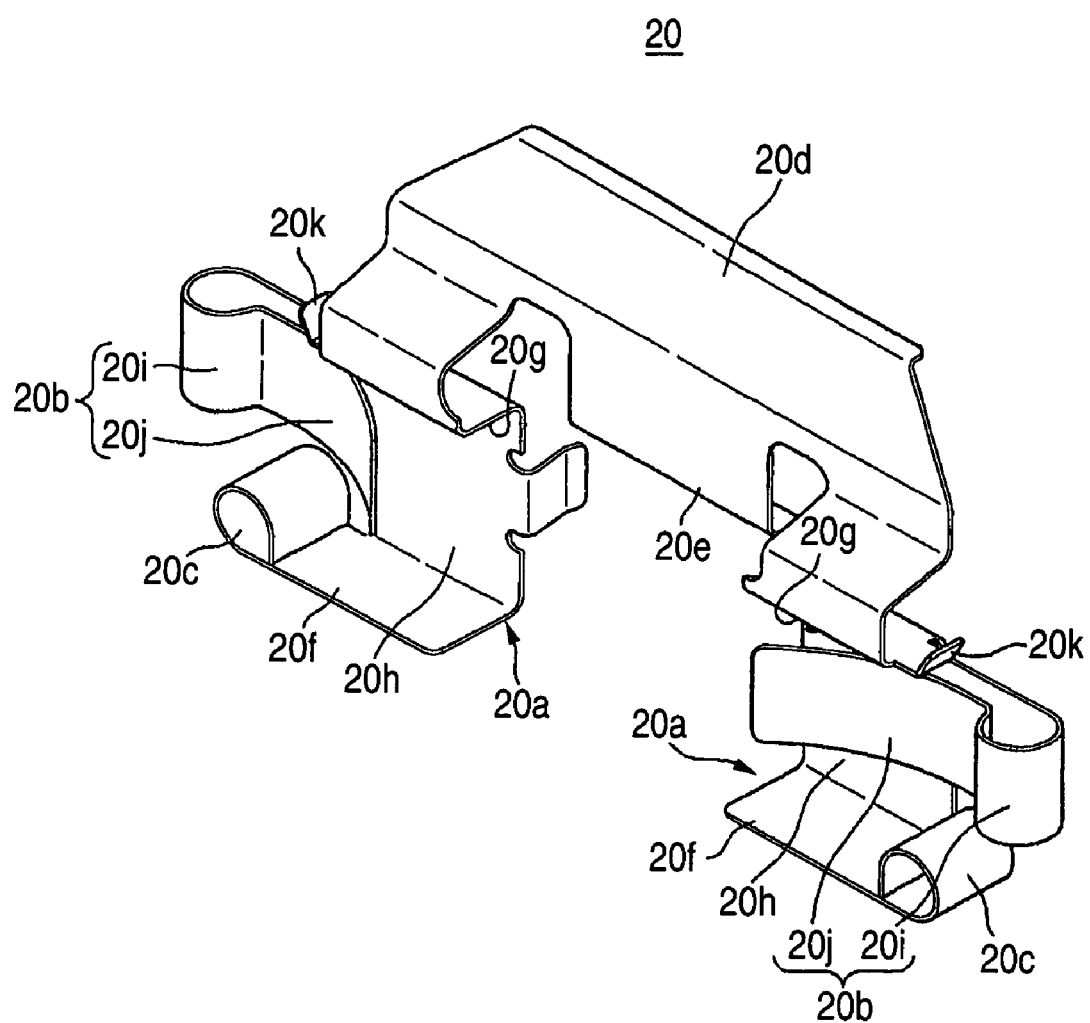
FIG. 4 is a perspective view of a pad retainer according to the first embodiment of the invention.
Figure 5:
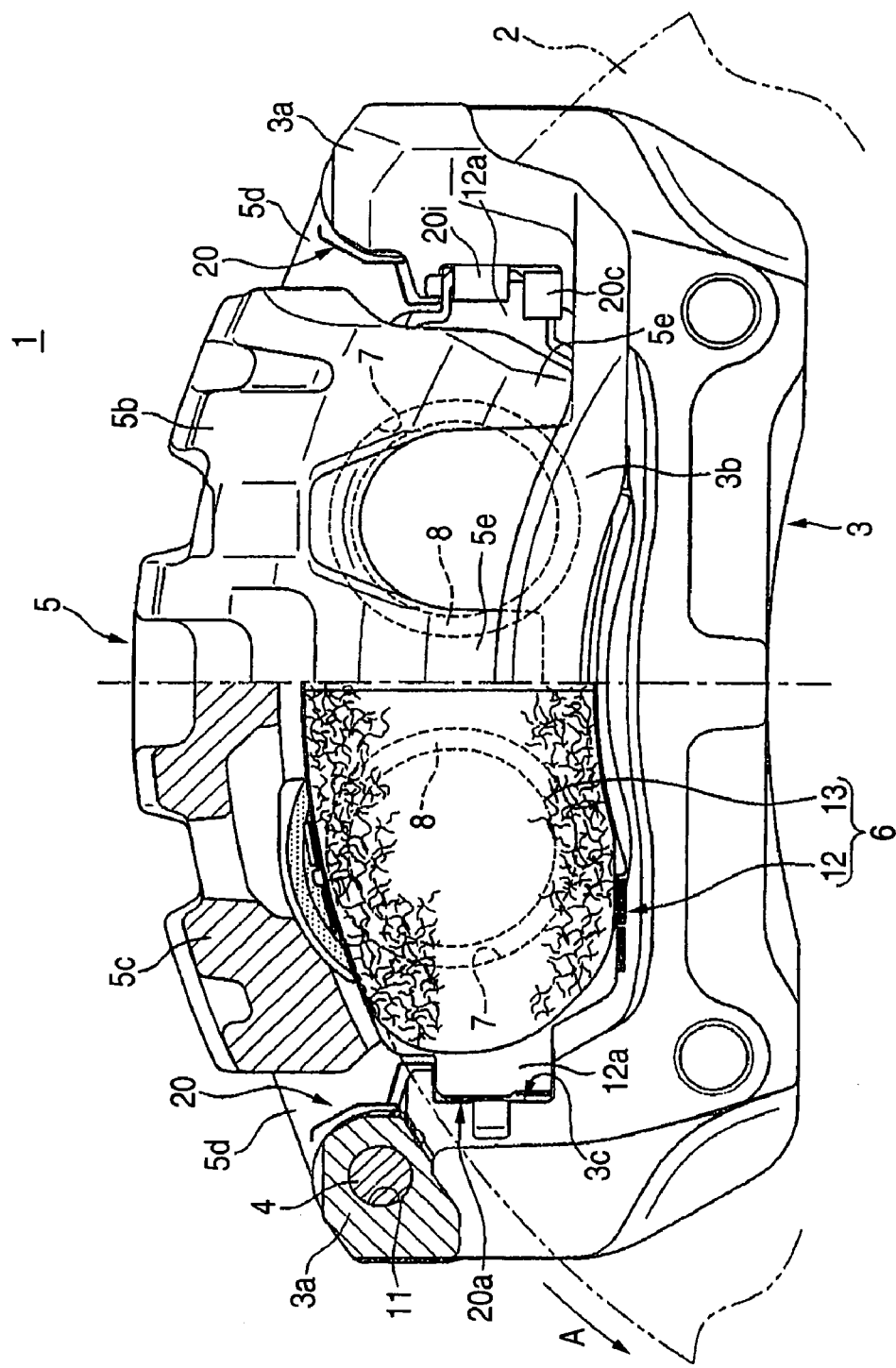
FIG. 5 is a partially sectional rear view of the disc brake according to the first embodiment of the invention.
Figure 6:
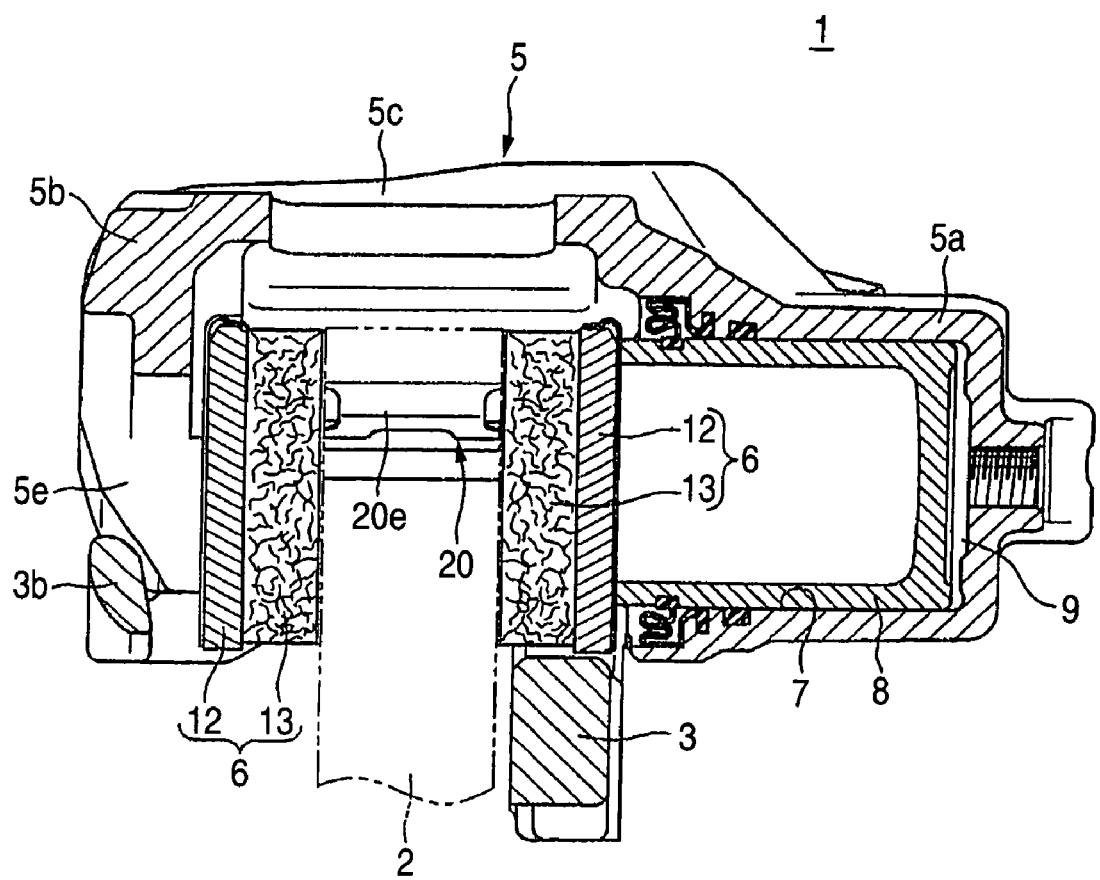
FIG. 6 is a sectional view taken along line VI—VI in FIG. 7.
Figure 7:
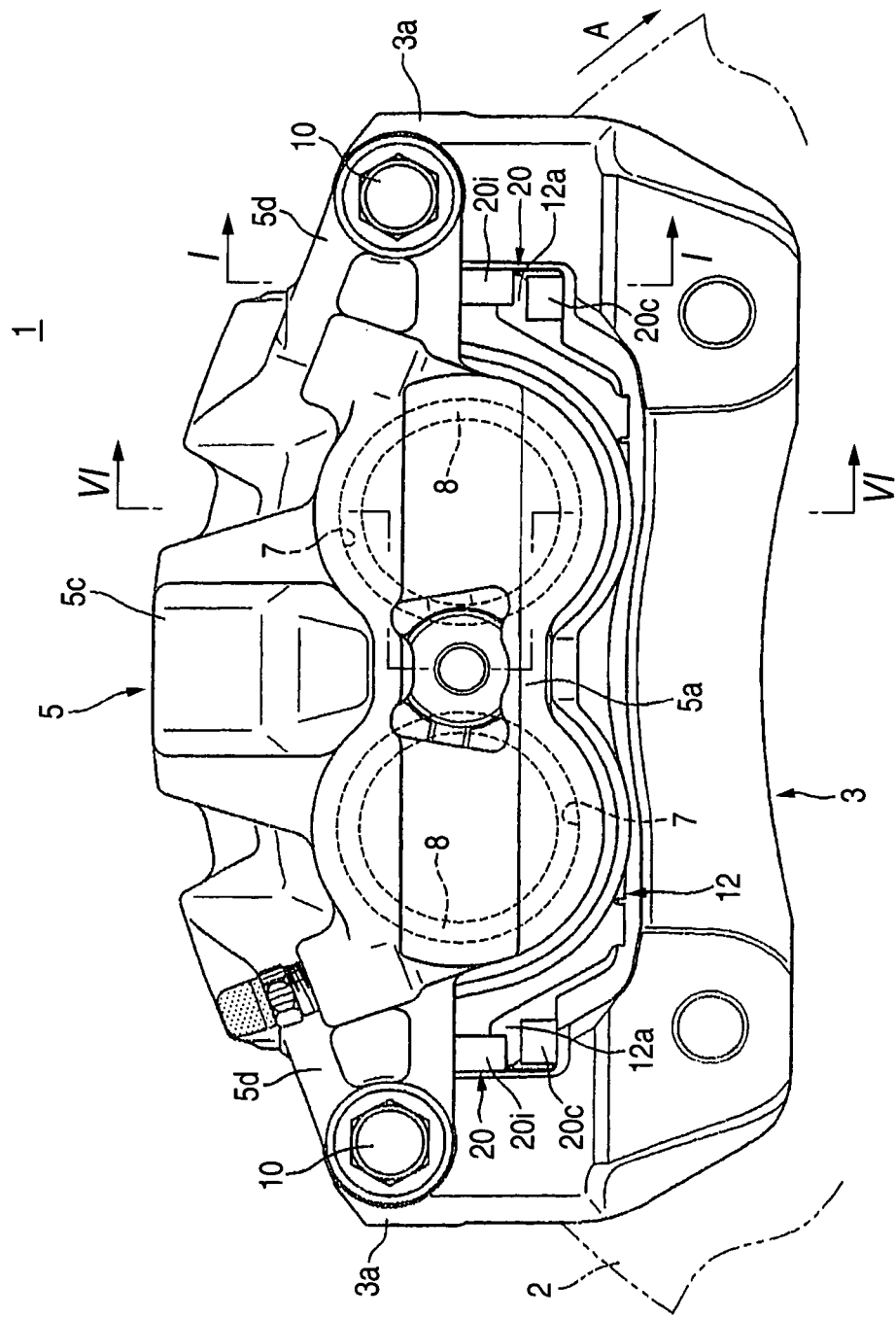
FIG. 7 is a front view of the disc brake according to the first embodiment of the invention.
Figure 8:
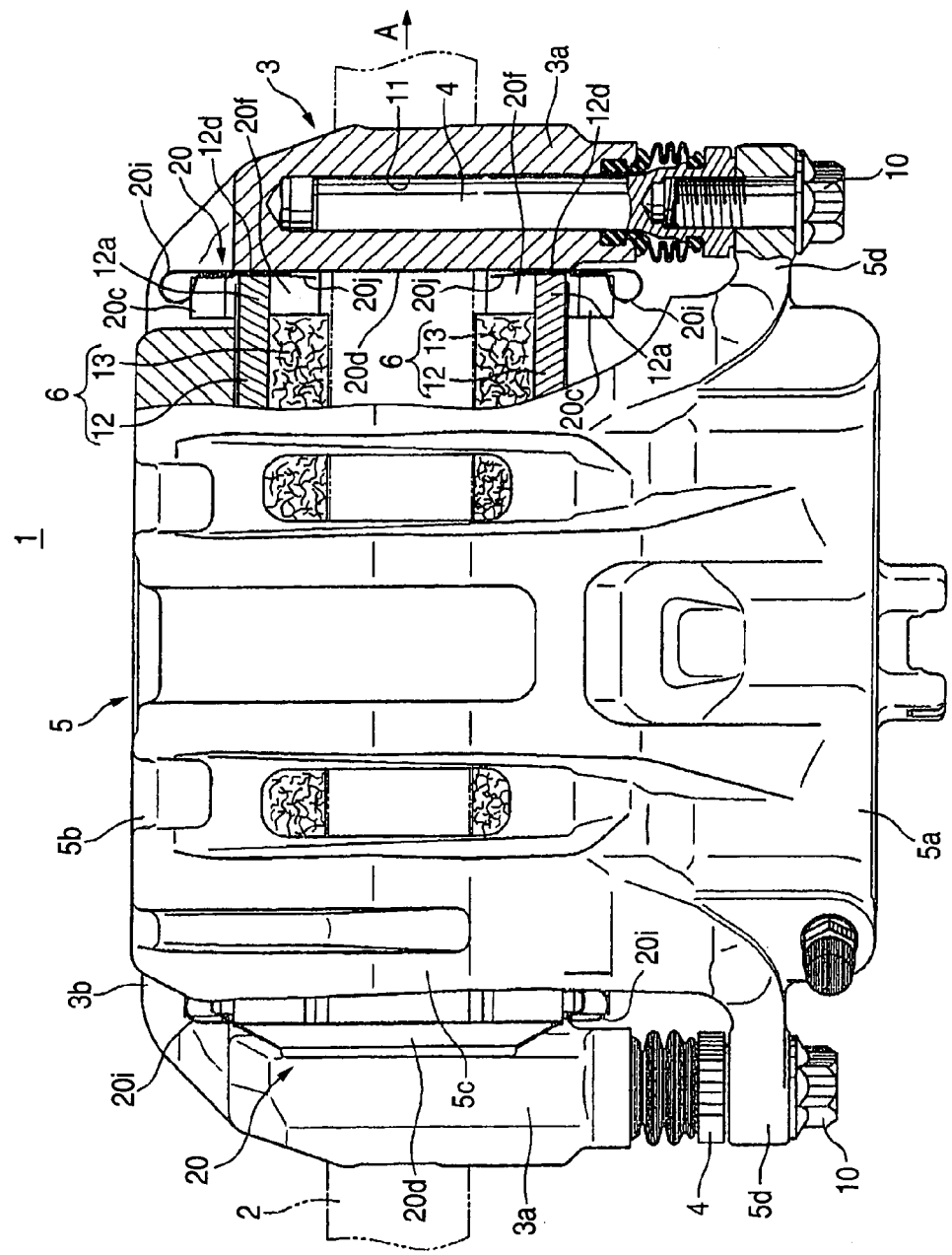
FIG. 8 is a plan view of the disc brake according to the first embodiment of the invention.

Embodiments of the present invention will be hereinafter described in detail with reference to the drawings. FIGS. 1–8 shows a first embodiment in which the invention is applied to a pin-slide-type disc brake. A disc brake 1 is composed of a disc rotor 2 that is to rotate together with a wheel, a caliper bracket 3 to be fixed to a vehicle body on one side of the disc rotor 2, a caliper body 5 that is supported by two caliper support arms 3a of the caliper bracket 3 via a pair of slide pins 4 so as to be movable in the disc axis direction, and a pair of friction pads 6 that are located inside an acting portion 5a and a reacting portion 5b of the caliper body 5 so as to be opposed to each other with the disc rotor 2 interposed in between.

The caliper body 5 is composed of the above-mentioned acting portion 5a and reacting portion 5b that are disposed on both sides of the disc rotor 2 and a bridge 5c that strides the outer periphery of the disc rotor 2 and connects the acting portion 5a and the reacting portion 5b. Two cylinder holes 7 are formed in the acting portion 5a so as to be opened on the disc rotor 2 side. A piston 8 that is shaped like a closed-end cylinder is housed in each cylinder hole 7, and each piston 8 is moved inside the cylinder hole 7 toward the disc rotor 2 by a pressurized fluid that is supplied to a fluid pressure room 9 that is formed at the bottom of the cylinder hole 7. Two vehicle body attachment arms 5d project sideways from the acting portion 5a, and the above-mentioned slide pins 4 are attached, by means of attachment bolts 10, to the tip portions of the vehicle body attachment arms 5d so as to project from the vehicle body attachment arms 5d, respectively.

The caliper support arms 3a are shaped so as to originate from positions on both sides of the caliper bracket 3, bridge the outer periphery of the disc rotor 2 in the disc axial direction with the bridge 5c interposed in between, and extend toward the disc center parallel with the side wall of the reacting portion 5b on the other side of the disc rotor 2. The tip portions of the caliper support arms 3a are connected to each other by a tie rod 3b to increase the rigidity of the support arms 3a on which braking torque is exerted.

A guide hole 11 that houses the above-mentioned slide pin 4 is formed in each caliper support arm 3a, and a total of four pad guide grooves 3c are formed in the caliper support arms 3a on both sides of the disc rotor 2 so as to be opposed to each other. Each pad guide groove 3c has a bracket shape having an outer (in the disc radial direction) side face 3d, an inner side face 3e, and an opposed face 3f that connects the outer face 3d and the inner face 3e. Two ears 12a projecting from both side portions of a back plate 12 of each friction pad 6 are movably supported by two (i.e., disc-entrance-side and disc-exit side) pad guide grooves 3c via pad retainers 20, respectively.

Each of the disc-entrance-side and disc-exit-side pad retainers 20 has a pair of retainer portions 20a that are set in the pad guide grooves 3c located on both sides the disc rotor 2, two pad returning portions 20b (i.e., pad returning mechanisms of the invention) and pad falling-off preventive portions 20c that are continuous with the respective retainer portions 20a, a link 20d that strides the outer periphery of the disc rotor 2 and connects the tops of the retainer portions 20a, and an attachment piece 20e that is locked with a rotor groove 3g of the caliper support arm 3a.

Each retainer portion 20a has an inner receiving piece 20f and an outer receiving piece 20g that are opposed to each other in a direction that is somewhat inclined from the disc radial direction with the ear 12a of the friction pad 6 interposed in between, and a side piece 20h that connects the pieces 20f and 20g.

On the opposite side of each side piece 20h to the disc rotor 2, a long and narrow piece extends outward in the disc axial direction from each side piece 20h and is bent back so as to assume a circular arc to form an elastic loop portion 20i. The long and narrow piece further extends toward the disc rotor 2 to form a pad springing-back portion 20j. The elastic loop portion 20i and the pad springing-back portion 20j constitute the above-mentioned pad returning portion 20b. Each pad springing-back portion 20j is longer than a distance by which the ear 12a of the friction pad 6 is moved from a time when a lining 13 is new to a time when it is fully worn. And each pad springing-back portion 20j is inclined, that is, warped, so as to go away gradually from the side piece 20h as it extends toward the disc rotor 2.

On the opposite side of each inner receiving piece 20f to the disc rotor 2, a long and narrow piece extends outward in the disc axial direction from each side piece 20h and is bent back so as to assume a circular arc to form the pad falling-off preventive portion 20c. To facilitate insertion of the ear 12a of the friction pad 6, an insertion guide 20k is bent outward from each outer receiving piece 20g on the side opposite to the disc rotor 2.

The pad retainer 20 having the above structure is set in such a manner that the inner receiving piece 20f and the outer receiving piece 20g of each retainer portion 20a is brought in contact with the inner (in the disc radial direction) side face 3e and the outer side face 3d of the pad guide groove 3c, respectively, and the side piece 20h is placed on the opposed face 3f of the pad guide groove 3c. As for each friction pad 6, the ears 12a of the back plate 12 are inserted in the disc-entrance-side and disc-exit-side pad guide grooves 3c, respectively, an outer (in the disc radial direction) side face 12b and an inner side face 12c of each ear 12a are brought in contact with the outer receiving piece 20g and the inner receiving piece 20f of the retainer portion 20a, respectively, and two (i.e., disc-entrance-side and disc-exit side) end faces 12d of the ears 12a are brought in contact with the pad springing-back portions 20j, respectively. With the friction pads 6 thus attached, the elastic loop portions 20i and the pad falling-off preventive portions 20c are located on the opposite sides of the ears 12a to the disc rotor 2.

In this embodiment having the above configuration, when each friction pad 6 is tentatively attached to the caliper support arms 3a of the caliper bracket 3, the pad falling-off preventive portions 20c project on the sides of the ears 12a opposite to the disc rotor 2. Therefore, even if the ears 12a that are in contact with the respective pad springing-back portions 20*j* are pushed away from the disc rotor 2, the pad falling-off preventive portions 20*c* contact the ends, opposite to the disc rotor 2, of the ears 12*a* and hence can prevent falling-off of the friction pad 6. The ease of attachment of each friction pad 6 can thus be increased. The elastic loop portions 20*i* that are located on the opposite sides of the ears 12*a* to the disc rotor 2 are effective in preventing, more reliably, the friction pad 6 from falling off the caliper support arms 3*a*. The caliper body 5 in which the pistons 8 are inserted is attached to the caliper bracket 3 to which the friction pads 6 are attached tentatively, and the disc rotor 2 is placed between the friction pads 6.

In the disc brake 1, when a pressurized operating fluid is supplied to the fluid pressure rooms 9 in response to a braking manipulation of the driver, the pistons 8 advance in the cylinder holes 7 and press the acting-portion-5*a*-side friction pad 6 against the one side surface of the disc rotor 2 that is rotating in the direction A. Resulting reaction force causes the caliper body 5 to move toward the acting portion 5*a* side while being guided by the slide pins 4, whereby a reaction force nail 5*e* presses the reacting-portion-5*b*-side friction pad 6 against the other side surface of the disc rotor 2. During that course, the ears 12*a* of each friction pad 6 are moved smoothly inside the respective pad guide grooves 3*c* while the outer (in the disc radial direction) side faces 12*b* and the inner side faces 12*c* are guided by the outer receiving pieces 20*g* and the inner receiving pieces 20*f* of the retainer portions 20*a*, respectively, and the end faces 12*d* of the ears 12*a* press the pad springing-back portions 20*j* against the side pieces 20*h*, respectively.

On the other hand, when the above braking manipulation is canceled, the pistons 8 and the reaction force nail 5*e* are retreated to their positions where they were located before the start of the braking. In returning to their original shapes, the elastic loop portions 20*i* and the pad springing-back portions 20*j* push the ears 12*a* that are in contact with the pad springing-back portions 20*j* away from the disc rotor 2, whereby each friction pad 6 is forcibly separated from the side surface of the disc rotor 2. As a result, dragging of each friction pad 6 can be prevented and juddering that is caused by wear of the disc rotor 2 and brake noise can be suppressed or reduced effectively.

As the lining 13 of each friction pad 6 is worn, the friction pad 6 gradually advances toward the disc rotor 2 and the ears 12*a* come to contact portions of the pad spring-back portions 20*j* that are closer to their tips, that is, more distant from the elastic loop portions 20*i*. Although the spring force from each elastic loop portion 20*i* decreases, increase in the force from the pad spring-back portion 20*i* can compensate for that decrease because the pad spring-back portion 20*i* is warped. Each friction pad 6 can reliably be separated from the side surface of the disc rotor 2 irrespective of the wear state of the lining 13.

A second embodiment of the present invention will be hereinafter described in detail with reference to the drawings. FIGS. 9–15 shows a second embodiment in which the invention is applied to a pin-slide-type disc brake. A disc brake 31 is composed of a disc rotor 32 that is to rotate together with a wheel, a caliper bracket 33 to be fixed to a vehicle body on one side of the disc rotor 32, a caliper body 35 that is supported by two caliper support arms 33*a* of the caliper bracket 33 via a pair of slide pins 34 so as to be movable in the disc axis direction, and a pair of friction pads 36 that are located inside an acting portion 35*a* and a reacting portion 35*b* of the caliper body 35 so as to be opposed to each other with the disc rotor 32 interposed in between.

The caliper body 35 is composed of the above-mentioned acting portion 35*a* and reacting portion 35*b* that are disposed on both sides of the disc rotor 32 and a bridge 35*c* that strides the outer periphery of the disc rotor 32 and connects the acting portion 35*a* and the reacting portion 35*b*. Two cylinder holes 37 are formed in the acting portion 35*a* so as to be opened on the disc rotor 32 side. A piston 38 that is shaped like a closed-end cylinder is housed in each cylinder hole 37, and each piston 38 is moved inside the cylinder hole 37 toward the disc rotor 32 by a pressurized fluid that is supplied to a fluid pressure room 39 that is formed at the bottom of the cylinder hole 37. Two vehicle body attachment arms 35*d* project sideways from the acting portion 35*a*, and the above-mentioned slide pins 34 are attached, by means of attachment bolts 40, to the tip portions of the vehicle body attachment arms 35*d* so as to project from the vehicle body attachment arms 35*d*, respectively.

The caliper support arms 33*a* are shaped so as to originate from positions on both sides of the caliper bracket 33, bridge the outer periphery of the disc rotor 32 in the disc axial direction with the bridge 35*c* interposed in between, and extend toward the disc center parallel with the side wall of the reacting portion 35*b* on the other side of the disc rotor 32. The tip portions of the caliper support arms 33*a* are connected to each other by a tie rod 33*b* to increase the rigidity of the support arms 33*a* on which braking torque is exerted.

A guide hole 41 that houses the above-mentioned slide pin 34 is formed in each caliper support arm 33*a*, and a total of four pad guide grooves 33*d* are formed in the caliper support arms 33*a* on both sides of the disc rotor 32 so as to be opposed to each other. Each pad guide groove 33*d* has a bracket shape having an outer (in the disc radial direction) side face 33*e*, an inner side face 33*f*, and an opposed face 33*g* that connects the outer face 33*e* and the inner face 33*f*. Two ears 42*a* projecting from both side portions of a back plate 42 of each friction pad 36 are movably supported by two (i.e., disc-entrance-side and disc-exit side) pad guide grooves 33*d* via pad retainers 50, respectively.

Each of the disc-entrance-side and disc-exit-side pad retainers 50 is composed of a pair of retainer portions 50*a* that are set in the pad guide grooves 33*d* located on both sides the disc rotor 32, two elastic loop portions 50 band pad springing-back portions 50*c* that are continuous with the respective retainer portions 50*a*, a link 50*d* that strides the outer periphery of the disc rotor 32 and connects the tops of the retainer portions 50*a*, and an attachment piece 50*e* that is locked with a rotor groove 33*h* of the caliper support arm 33*a*. Each retainer portion 50*a* is composed of an inner receiving piece 50*f* and an outer receiving piece 50*g* that are opposed to each other in a direction that is somewhat inclined from the disc radial direction with the ear 42*a* of the friction pad 36 interposed in between, and a side piece 50*h* that connects the pieces 50*f* and 50*g*.

Each inner receiving piece 50*f* is connected to the pad springing-back portion 50*c* via the circular-arc-shaped elastic loop portion 50*b* that is located outside the inner receiving piece 50*f* in the disc axial direction. Each elastic loop portion 50*b* is formed by bending back, toward the disc rotor 32 in circular arc form, a long and narrow piece extending from the inner receiving piece 50*f* horizontally away from the disc rotor 32. The long and narrow piece further extends from the elastic loop portion 50*b* toward the disc rotor 32 to form the pad springing-back portion 50*c*.

Each pad springing-back portion 50c is longer than a distance by which the ear 42a of the friction pad 36 is moved from a time when the lining 43 is new to a time when it is fully worn. And each pad springing-back portion 50c is inclined, that is, warped, so as to go away gradually from the inner receiving piece 50f as it extends toward the disc rotor 32. To facilitate insertion of the ear 42a of the friction pad 36, insertion guides 50i are bent outward from each outer receiving piece 50g and each side piece 50h on the side opposite to the disc rotor 32.

The pad retainer 50 having the above structure is set in such a manner that the inner receiving piece 50f and the outer receiving piece 50g of each retainer portion 50a are brought in contact with the inner (in the disc radial direction) side face 33f and the outer side face 33e of the pad guide groove 33d, respectively, and the side piece 50h is placed on the opposed face 33g of the pad guide groove 33d. As a result, each elastic loop portion 50b is disposed adjacent to the caliper support arm 33a on the side opposite to the disc rotor 32, and each pad springing-back portion 50c is disposed closer to the disc rotor 32 than the elastic loop portion 50b is and is inclined, i.e., warped, so as to gradually come closer to the outer (in the disc radial direction) side face 33e of the pad guide groove 33d as it extends toward the disc rotor 32.

As for each friction pad 36, the ears 42a of the back plate 42 are inserted in the disc-entrance-side and disc-exit-side pad guide grooves 33d, respectively, the outer (in the disc radial direction) side faces 42c of the ears 42a are brought in contact with the outer receiving pieces 50g of the retainer portions 50a, respectively, and the inner (in the disc radial direction) side faces 42b of the ears 42a are brought in contact with the pad spring-back portions 50c, respectively. With the friction pads 36 thus attached, the elastic loop portions 50b are located on the opposite sides of the ears 42a to the disc rotor 32.

In this embodiment having the above configuration, when a pressurized operating fluid is supplied to the fluid pressure rooms 39 in response to a braking manipulation of the driver, the pistons 38 advance in the cylinder holes 37 and press the acting-portion-35a-side friction pad 36 against the one side surface of the disc rotor 32 that is rotating in the direction A. Resulting reaction force causes the caliper body 35 to move toward the acting portion 35a side while being guided by the slide pins 34, whereby a reaction force nail 35e presses the reacting-portion-35b-side friction pad 36 against the other side surface of the disc rotor 32.

During that course, the ears 42a of each friction pad 36 are moved smoothly inside the respective pad guide grooves 33d while the outer (in the disc radial direction) side faces 42c of the ears 42a are guided by the outer receiving pieces 50g of the retainer portions 50a, respectively, and the inner (in the disc radial direction) side faces 42b press the pad springing-back portions 50c against the inner receiving pieces 50f, respectively. While the pad springing-back portions 50c are pressed against the inner receiving pieces 50f by the ears 42a, the spring force of the elastic loop portion 50b and the pad springing-back portions 50c pushes the inner side faces 42b of the ears 42a toward the outer (in the disc radial direction) side faces 33e of the pad guide grooves 33d.

As a result, the outer (in the disc radial direction) side faces 42c of the ears 42a are always pressed against the outer (in the disc radial direction) side faces 33e of the pad guide grooves 33d. Therefore, the ears 42a do not play inside the pad guide grooves 33d during the braking, whereby generation of a friction pad striking sound due to play of the ears 42a can be prevented and brake noise can be reduced effectively.

On the other hand, when the above braking manipulation is canceled, the pistons 38 and the reaction force nail 35e are retreated to their original positions where they were located before the start of the braking. In returning to their original shapes, the elastic loop portions 50b and the pad springing-back portions 50c push the ears 42a that are in contact with the pad springing-back portions 50c away from the disc rotor 32, whereby each friction pad 36 is forcibly separated from the side surface of the disc rotor 32. As a result, dragging of each friction pad 36 can be prevented and juddering that is caused by wear of the disc rotor 32 and brake noise can be suppressed or reduced effectively.

As the lining 43 of each friction pad 36 is worn, the friction pad 36 gradually advances toward the disc rotor 32 and the ears 42a come to contact portions of the pad spring-back portions 50c that are closer to their tips. Although the spring force from each elastic loop portion 50b decreases, increase in the force from the pad spring-back portion 50c can compensate for that decrease because the pad spring-back portion 50c is warped. Each friction pad 36 can reliably be separated from the side surface of the disc rotor 32 and play of each friction pad 36 can be prevented irrespective of the wear state of the lining 43.

When each friction pad 36 is tentatively attached to the caliper support arms 33a of the caliper bracket 33, the elastic loop portions 50b are located on the opposite sides of the ears 42a to the disc rotor 32. Therefore, even if the ears 42a are pushed away from the disc rotor 32, the elastic loop portions 50b contact the ends, opposite to the disc rotor 32, of the ears 42a and hence can prevent falling-off of the friction pad 36. The ease of attachment of each friction pad 36 can thus be increased.

The invention is not limited to the case of using the pad retainer of the above embodiment. As long as the pad retainer has the receiving pieces to contact the inner (in the disc radial direction) side faces of the pad guide grooves, the elastic loop portions, and the pad springing-back portions, the other portions such as the link and the attachment piece may have any shapes.

Figure 9:
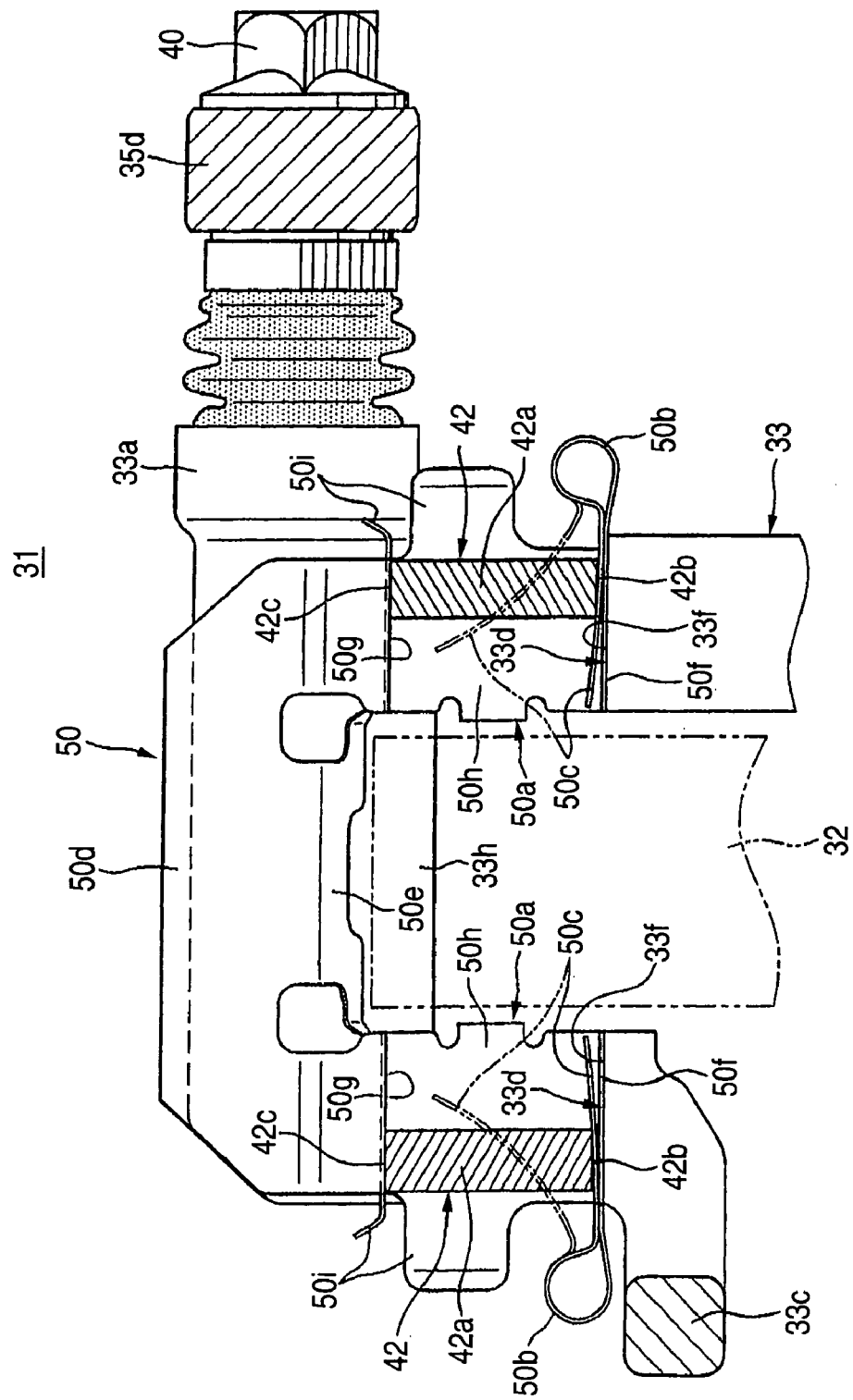
FIG. 9 is a sectional view taken along line IX—IX in FIG. 14.
Figure 10:
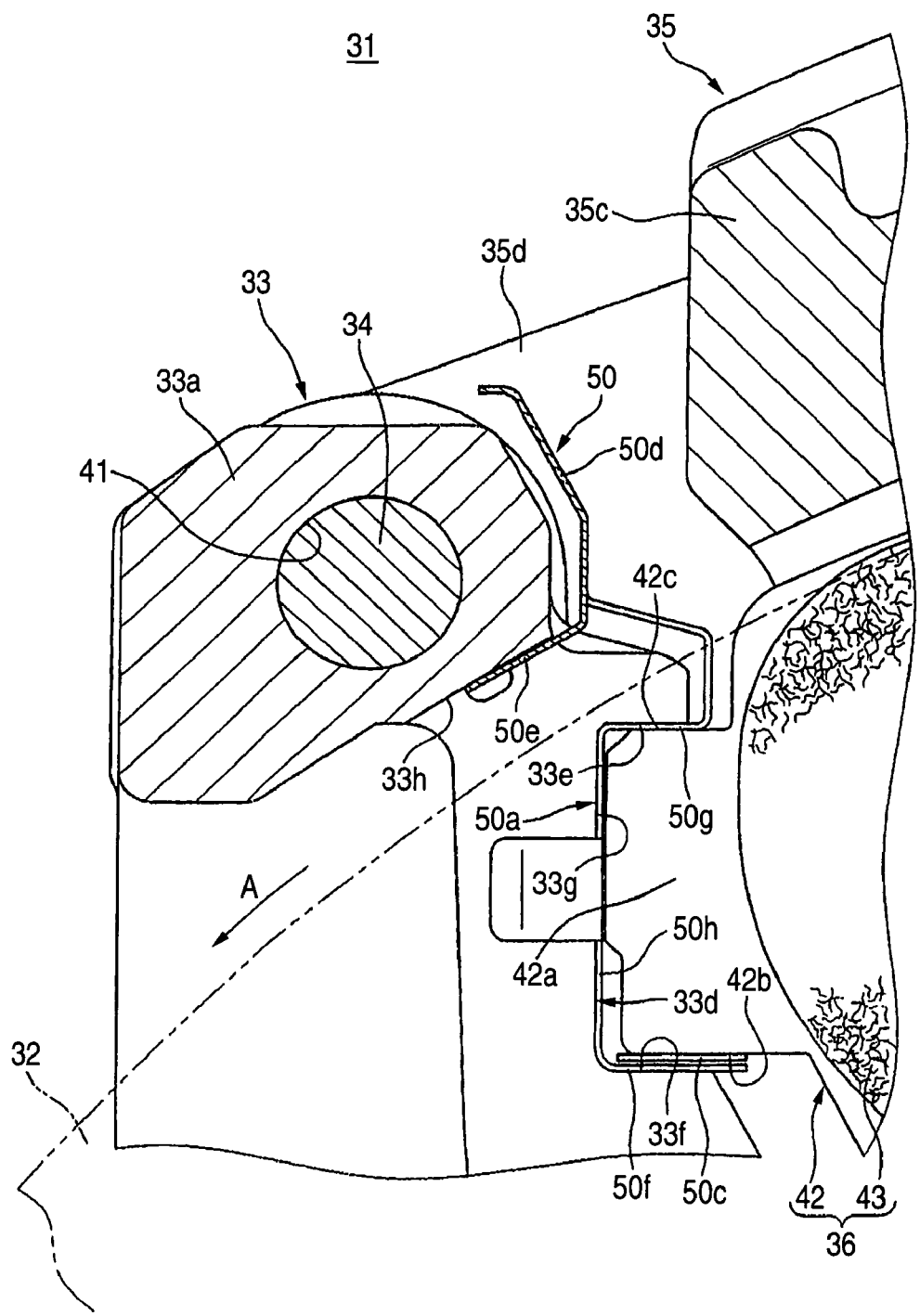
FIG. 10 is an enlarged sectional view of an important part of a disc brake according to a second embodiment of the present invention.
Figure 11:
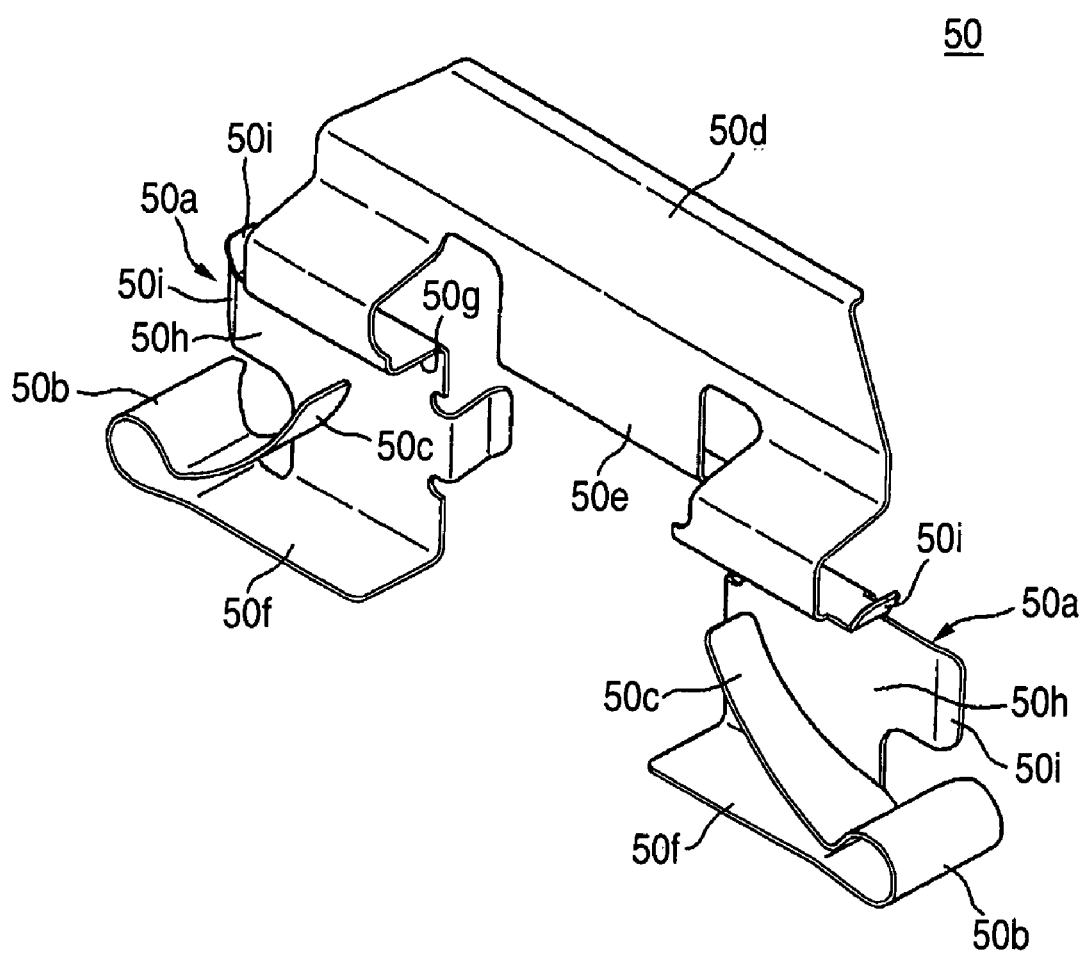
FIG. 11 is a perspective view of a pad retainer according to the embodiment of the invention.
Figure 12:
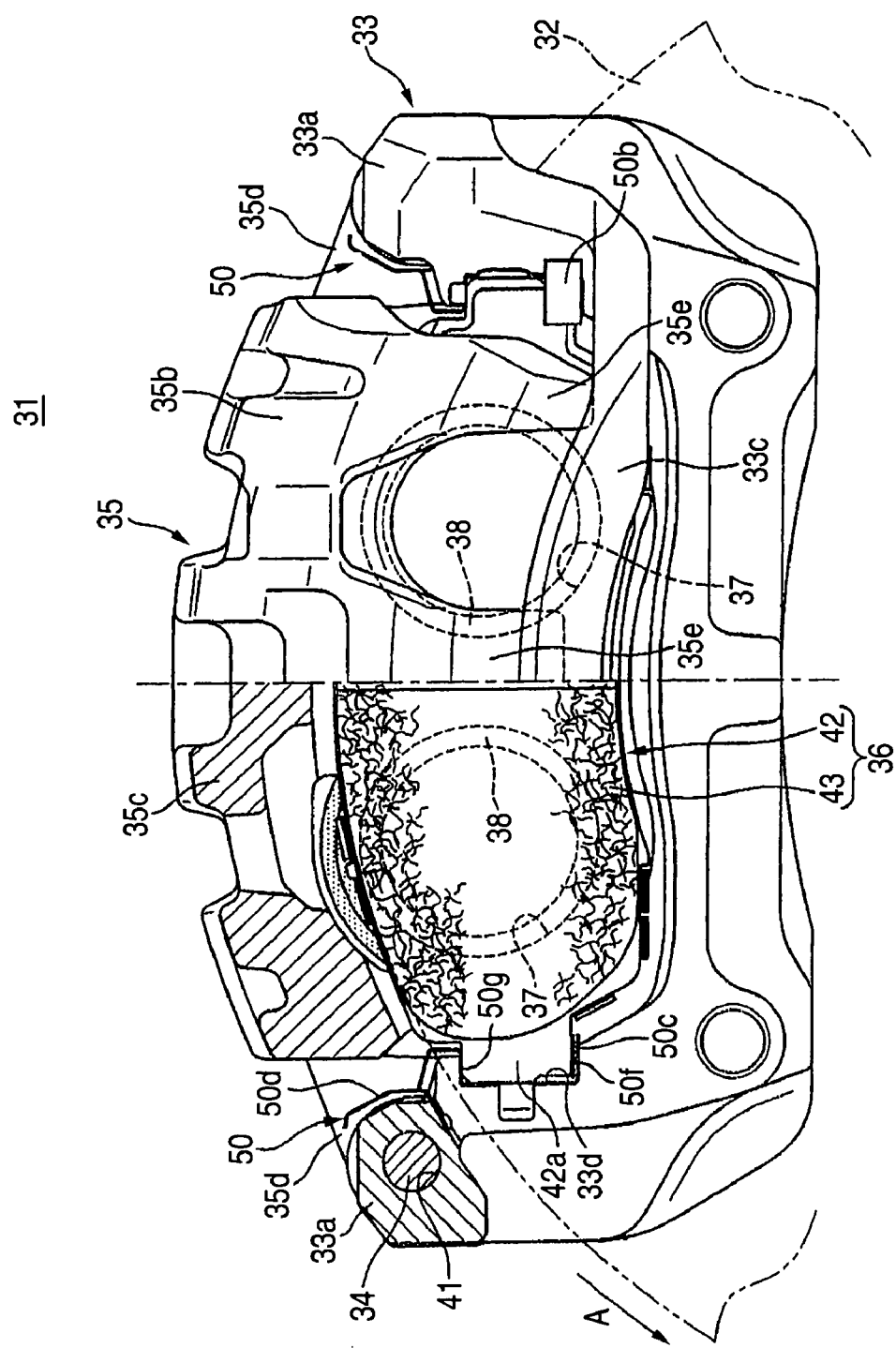
FIG. 12 is a partially sectional rear view of the disc brake according to the embodiment of the invention.
Figure 13:
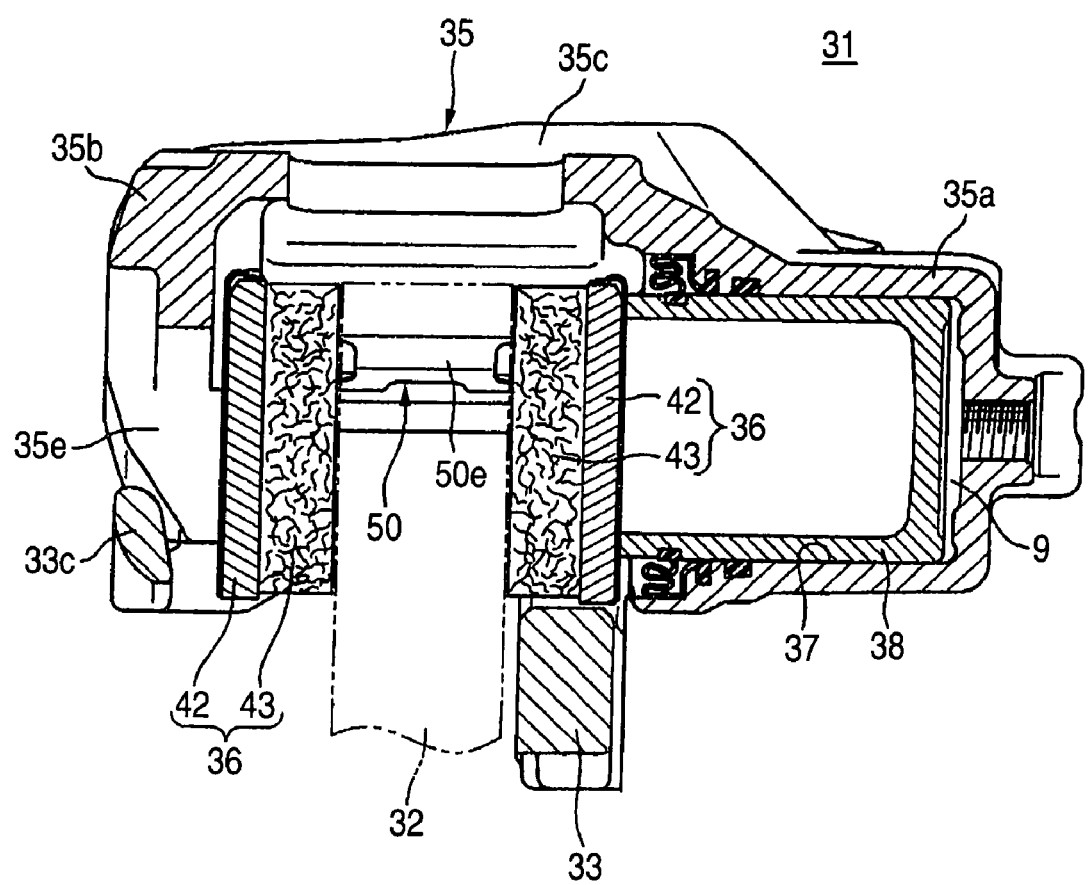
FIG. 13 is a sectional view taken along line XIII—XIII in FIG. 14.
Figure 14:
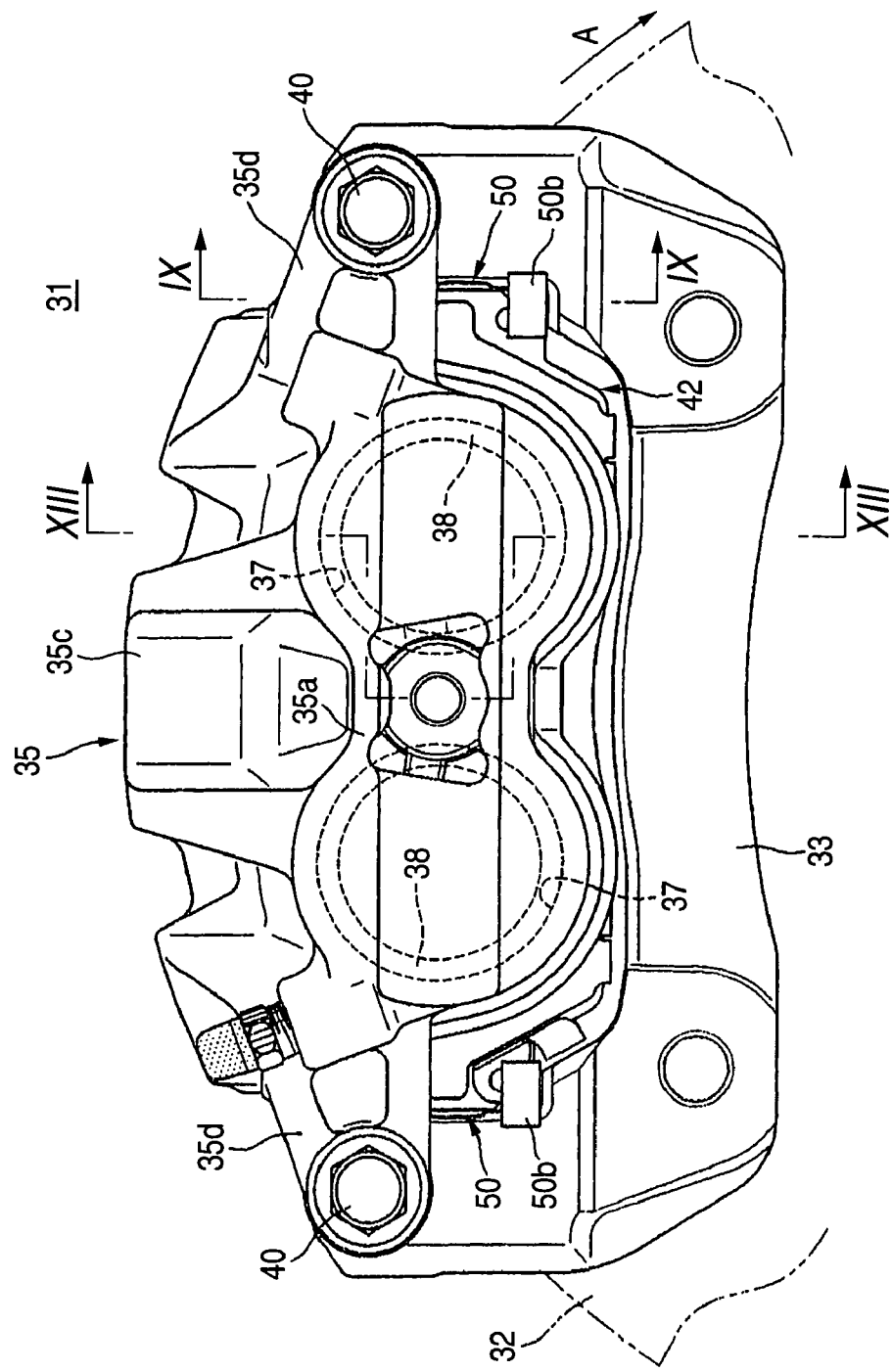
FIG. 14 is a front view of the disc brake according to the embodiment of the invention.
Figure 15:
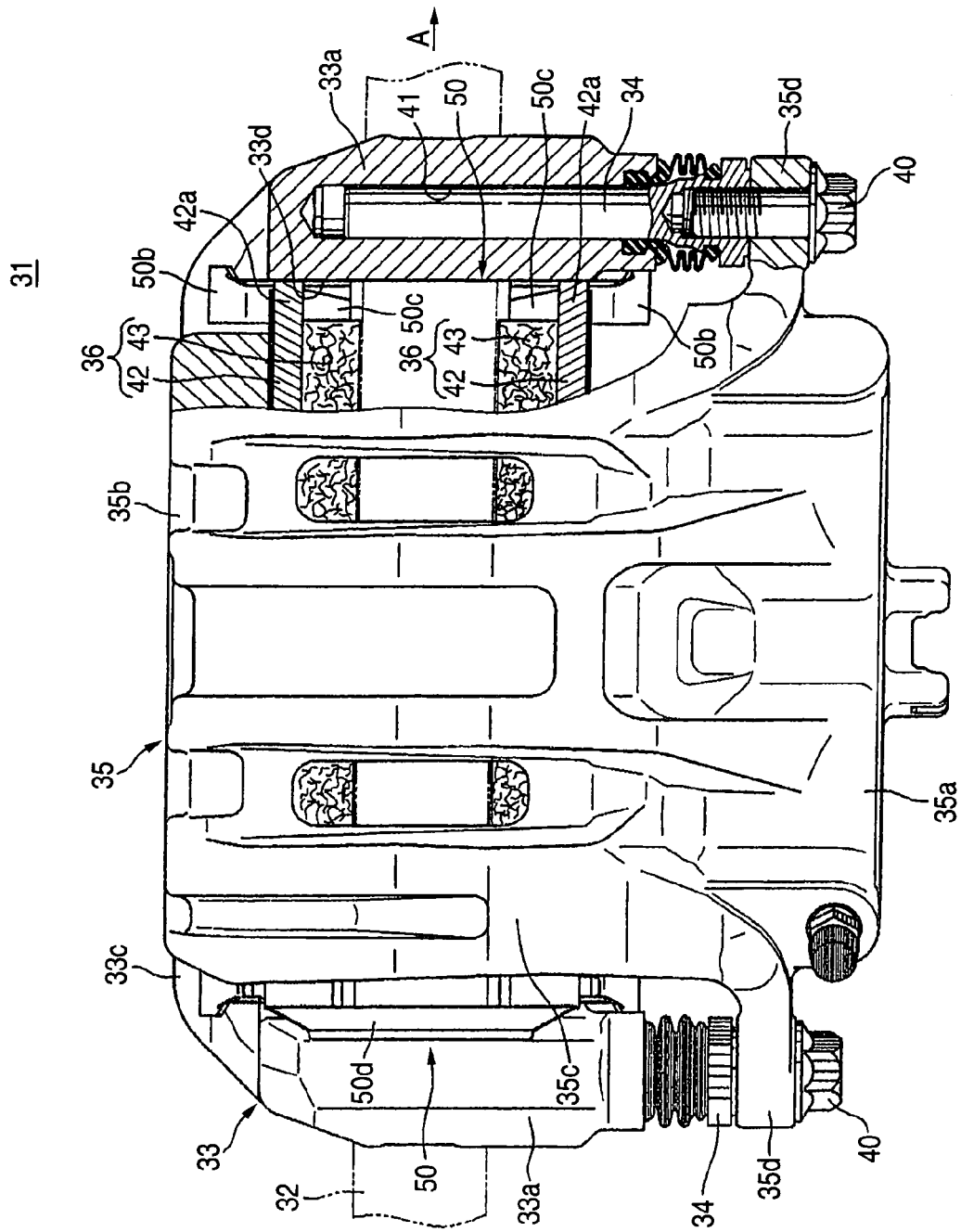
FIG. 15 is a plan view of the disc brake according to the embodiment of the invention.

Next, the second embodiment of the invention will be described with reference to FIGS. 9 and 11 in detail. In a pad retainer 41 according to this embodiment, the inner receiving piece 50f of each retainer portion 50a is formed with a pad falling-off preventive portion 50b having a springing-back function and a pad springing-back portion 50c that are continuous with each other. The pad falling-off preventive portion 50b and the pad springing-back portion 50c constitute a pad returning portion (i.e., a pad returning mechanism of the invention).

Each retainer portion 50a has an inner receiving piece 50f, an outer receiving piece 50g that is opposed to the inner receiving piece 50f, and a side piece 50h that connects the inner receiving piece 50f and the outer receiving piece 50g. The tops of the two retainer portions 50a are connected to each other by a link 50d. The link 50d is formed with an attachment piece 50e that is locked with the rotor groove 33h of the caliper support arm 33a. Each outer receiving piece 50g and each side piece 50h are formed with insertion guides 50i, respectively.

A long and narrow piece extending from each inner receiving piece 50f horizontally away from the disc rotor 32 is bent back toward the disc rotor 32 so as to assume a circular arc to form the loop-shaped pad falling-off preventive portion 50b having a spring force. The long and narrow piece further extends from the pad falling-off preventive portion 50b toward the disc rotor 32 to form the pad springing-back portion 50c. Each pad springing-back portion 50c is longer than a distance by which the ear 42a of the friction pad 36 is moved from a time when the lining 43 is new to a time when it is fully worn. And each pad springing-back portion 50c is inclined, that is, warped, so as to go away gradually from the inner receiving piece 50f as it extends toward the disc rotor 32.

The pad retainer 41 having the above structure is set in such a manner that the inner receiving piece 50f and the outer receiving piece 50g of each retainer portion 50a are brought in contact with the inner (in the disc radial direction) side face 33f and the outer side face 33d of the pad guide groove 33c, respectively, and the side piece 50h is placed on the opposed face 33f of the pad guide groove 33c. As for each friction pad 36, the ears 42a of the back plate 42a are inserted in the pad guide grooves 33c, respectively, the outer (in the disc radial direction) side faces 42b of the ears 42a are brought in contact with the outer receiving pieces 50g of the retainer portions 50a, respectively, and the inner (in the disc radial direction) side faces 42c of the ears 42a are brought in contact with the pad spring-back portions 50c, respectively. With the friction pads 36 thus attached, the pad falling-off preventive portions 50b are located on the opposite sides of the ears 42a to the disc rotor 32.

In this embodiment, during braking, the ears 42a of each friction pad 36 are moved smoothly inside the respective pad guide grooves 33c while the outer (in the disc radial direction) side faces 42b of the ears 42a are guided by the outer receiving pieces 50g of the retainer portions 50a, respectively, and the inner (in the disc radial direction) side faces 42c press the pad springing-back portions 50c against the inner receiving pieces 50f, respectively. The pad springing-back portions 50c push the inner side faces 42c of the ears 42a toward the outer (in the disc radial direction) side faces 33d of the pad guide grooves 33c and thereby always press the outer (in the disc radial direction) side faces 42b of the ears 42a against the outer (in the disc radial direction) side faces 33d of the pad guide grooves 33c.

On the other hand, when the above braking is canceled, in returning to their original shapes, the pad falling-off preventive portions 50b and the pad springing-back portions 50c push the ears 42a that are in contact with the pad springing-back portions 50c away from the disc rotor 32, whereby each friction pad 36 is forcibly separated from the side surface of the disc rotor 32. As in the case of the first embodiment, even if the lining 43 of each friction pad 36 is worn, resulting reduction in spring force can be compensated for by increase in the force from the pad springing-back portions 50c because they are warped.

In this embodiment, the falling-off preventive portions 50b also have the function of the falling-off preventive portions 40c of the first embodiment. Therefore, the ease of attachment of each friction pad 36 can be increased inexpensively without increasing the number of parts.

The invention is not limited to the above embodiments. The pad falling-off preventive portions according to the invention may be combined with an existing pad retainer. The shape of each pad falling-off preventive portion is not limited to the loop shape and may have any shape. Further, although in the above embodiments the pad returning portions as the pad returning mechanisms of the invention are integral with the pad retainer, the pad returning mechanisms may be known mechanisms that are separated from the pad retainer.

As described above, according to the disc brake for the vehicle of the invention, the friction pads can be prevented from falling off the caliper bracket in attaching the friction pads to the caliper bracket tentatively. Therefore, the attachment work does not require much time and the manufacturing cost can be reduced accordingly.

As described above, according to the invention, the pad springing-back portions formed in the pad retainers are solely able to not only return the friction pads but also effectively prevent play of the ears to thereby reduce brake noise and suppress juddering caused by wear of the disc rotor and effectively prevent generation of a friction pad striking sound due to play of the ears.

Dragging of the friction pads and play of the ears can be prevented reliably from a time when the friction pads are new to a time when they are fully worn. Further, the friction pads can be prevented from falling off the caliper bracket in attaching the friction pads to the caliper bracket tentatively, and hence the attachment work does not require much time.

What is claimed is:

1. A disc brake for a vehicle comprising:
    a caliper bracket fixed to a vehicle body;
    a pair of caliper support arms striding an outer periphery of a disc rotor in a disc axial direction;
    pad guide grooves formed in the caliper support arms so as to be opposed to each other;
    friction pads disposed on both sides of the disc rotor, the friction pads having ears projected from both side portions of a back plate thereof; and
    pad retainers disposed on the pad guide grooves, the ears of the friction pads being movably supported by the pad guide grooves and between receiving portions of the pad retainers,
    wherein the pad retainers each has:
        pad returning portions for urging the friction pads away from the disc rotor, the pad returning portions extending between the receiving portions and contact the ear of the friction pads so as to urge the friction pads away from the disc rotor, and
        pad falling-off preventive portions for preventing the friction pads from falling off the caliper support arms in the disc axial direction.

2. A disc brake for a vehicle as set forth in claim 1, wherein the pad returning portions includes: an elastic loop portion formed by a long and narrow piece outwardly extended away from the disc rotor in the disc axial direction and bent back to the disc rotor in the disc axial direction; and a pad springing-back portion formed by the long and narrow piece further extended toward the disc rotor and outwardly inclined in a disc radial direction.

3. A disc brake for a vehicle as set forth in claim 2, wherein the long and narrow piece of the elastic loop portion is bent back so as to form a circular arc, and the long and narrow piece of the pad springing-back portion is warped as a shape of a curvature.

4. A disc brake for a vehicle as set forth in claim 1, wherein the pad guide grooves are formed by bracket-shaped grooves each having a disc radial direction outer side face, a disc radial direction inner side face, and an opposed face connecting the two side faces.

5. A disc brake for a vehicle as set forth in claim 1, wherein the pad retainer includes a receiving piece contacted with a disc radial direction inner side face and a long and narrow piece extended from the receiving piece away from the disc rotor, a proximal portion of the long and narrow piece is bent back toward the disc rotor in a circular arc to form an elastic loop portion, and a tip portion of the long and narrow piece that extends from the elastic loop portion toward the disc rotor is outwardly inclined in the disc radial direction to form a pad springing-back portion, and wherein the pad springing-back portion is contacted with a disc radial direction inner side face of the ear to urge the ear away from the disc rotor and outward in the disc radial direction.

6. A disc brake for a vehicle as set forth in claim 5, wherein the pad springing-back portion is warped as a shape of a curvature as it extends from the proximal portion.

7. A disc brake for a vehicle as set forth in claim 5, wherein the elastic loop portion is located on an opposite side of the ear to the disc rotor.

8. A disc brake for a vehicle as set forth in claim 6, wherein the elastic loop portion is located on an opposite side of the ear to the disc rotor.

9. A disc brake for a vehicle as set forth in claim 1, wherein the receiving portions include an inner receiving portion and an outer receiving portion and the ears of the friction pads are movably supported by the pad guide grooves via the inner receiving portion and the outer receiving portion.

10. A disc brake for a vehicle as set forth in claim 9, wherein the pad falling-off preventive portions extend from the inner receiving portion outward in a disc axial direction.

11. A disc brake for a vehicle as set forth in claim 1, comprising:
a caliper bracket fixed to a vehicle body;
a pair of caliper support arms striding an outer periphery of a disc rotor in a disc axial direction;
pad guide grooves formed in the caliper support arms so as to be opposed to each other;
friction pads disposed on both sides of the disc rotor, the friction pads having ears projected from both side portions of a back plate thereof; and
pad retainers disposed on the pad guide grooves, the ears of the friction pads being movably supported by the pad guide grooves and between receiving portions of the pad retainers,
wherein the pad retainers each has:
pad returning portions for urging the friction pads away from the disc rotor, the pad returning portions extending between the receiving portions and contact the ear of the friction pads so as to urge the friction pads away from the disc rotor, and
pad falling-off preventive portions for preventing the friction pads from falling off the caliper support arms, and
wherein each said pad falling-off preventive portion is bent back so as to form a circular arc.

12. A disc brake for a vehicle comprising:
a caliper bracket fixed to a vehicle body;
a pair of caliper support arms striding an outer periphery of a disc rotor in a disc axial direction;
pad guide grooves formed in the caliper support arms so as to be opposed to each other;
friction pads disposed on both sides of the disc rotor, the friction pads having ears projected from both side portions of a back plate thereof; and
pad retainers disposed on the pad guide grooves, the ears of the friction pads being movably supported by the pad guide grooves and between receiving portions of the pad retainers,
wherein the pad retainers each has:
pad returning portions for urging the friction pads away from the disc rotor, the pad returning portions extending between the receiving portions and contact the ear of the friction pads so as to urge the friction pads away from the disc rotor, and
pad falling-off preventive portions for preventing the friction pads from falling off the caliper support arms,
wherein each pad returning portion includes: an elastic loop portion formed by a long and narrow piece outwardly extended away from the disc rotor in the disc axial direction and bent back to the disc rotor in the disc axial direction: and a pad springing-back portion formed by the long and narrow piece further extended toward the disc rotor and outwardly inclined in a disc radial direction, and
wherein the elastic loop portion is an other pad falling-off preventive portion.

13. A disc brake for a vehicle comprising:
a caliper bracket fixed to a vehicle body;
a pair of caliper support anus striding an outer periphery of a disc rotor in a disc axial direction;
pad guide grooves formed in the caliper support arms so as to be opposed to each other;
friction pads disposed on both sides of the disc rotor, the friction pads having ears projected from both side portions of a back plate thereof, the ears of the friction pads being movably supported by the pad guide grooves; and
pad retainers disposed on the pad guide grooves, the pad retainers including:
an extending portion extending in a disc radial direction behind the friction pad, and
a pad returning portion extending at least partially between receiving portions of the pad retainers and comprising an elongated strip which extends towards the disc rotor and is longer than a distance by which the ears of the friction pad is moved from a time when a lining of the friction pad is new to being frilly worn.

14. A disc brake for a vehicle as set forth in claim 13, wherein the pad returning portion includes a spring back portion comprising a piece extending outward in the disc axial direction and the extending portion includes a bent back portion to form a circular arc forming an elastic loop portion.

15. A disc brake for a vehicle as set forth in claim 13, wherein the pad retainers include retainer portions having an inner receiving piece and an outer receiving piece that are opposed to each other, with the ear of the friction pad interposed in between.

16. A disc brake for a vehicle as set forth in claim 15, wherein the pad retainers include an insertion guide which is bent outward from each outer receiving piece on a side opposite to the disc rotor.

17. A disc brake for a vehicle as set forth in claim 13, wherein the extending portion is a pad falling-off preventive portion structured and arranged to prevent the friction pads from falling off the caliper support arms in the disc axial direction.

18. A disc brake for a vehicle comprising:
a caliper bracket fixed to a vehicle body;
a pair of caliper support arms striding an outer periphery of a disc rotor in a disc axial direction;
pad guide grooves formed in the caliper support arms so as to be opposed to each other;
friction pads disposed on both sides of the disc rotor, the friction pads having ears projected from both side portions of a back plate thereof, the ears of the friction pads being movably supported by the pad guide grooves; and pad retainers disposed on the pad guide grooves, the pad retainers including a pad returning portion extending at least partially between receiving portions of the pad retainers and comprising an elongated strip which extends towards the disc rotor and is longer than a distance by which the ears of the friction pad is moved from a time when a lining of the friction pad is new to being filly worn, wherein the pad retainers include retainer portions having an inner receiving piece and an outer receiving piece that are opposed to each other, with the ear of the friction pad interposed in between, and wherein the inner receiving piece comprises a pad falling-off preventive portion that is bent back so as to form a circular arc.

19. A disc brake for a vehicle comprising:

a caliper bracket fixed to a vehicle body;

a pair of caliper support arms striding an outer periphery of a disc rotor in a disc axial direction;

pad guide grooves formed in the caliper support arms so as to be opposed to each other;

friction pads disposed on both sides of the disc rotor, the friction pads having ears projected from both side portions of a back plate thereof the ears of the friction pads being movably supported by the pad guide grooves; and pad retainers disposed on the pad guide grooves, the pad retainers including a pad returning portion extending at least partially between receiving portions of the pad retainers and comprising an elongated strip which extends towards the disc rotor and is longer than a distance by which the ears of the friction pad is moved from a time when a lining of the friction pad is new to being fully worn, wherein the pad returning portion comprises a piece extending outward in the disc axial direction and is bent back to form a circular arc to form an elastic loop portion, the pad retainers include retainer portions having an inner receiving piece and an outer receiving piece that are opposed to each other in a direction that is inclined from a disc radial direction, the inner receiving piece comprises a pad falling-off preventive portion that is bent back so as to form a circular arc, and the elastic loop portion and the pad falling-off preventive portion are located on opposite sides of the ears.

20. A disc brake for a vehicle comprising:

a caliper bracket;

a pair of caliper support arms coupled to the caliper bracket;

pad guide grooves formed in the caliper support arms so as to be opposed to each other; and pad retainers disposed on the pad guide grooves, the pad retainers including:

a pad returning portion comprising an elongated strip adapted to extend towards a disc rotor and an elastic loop portion on an opposing side thereof;

a retainer portion having an inner receiving piece and an outer receiving piece that are opposed to each other in a direction that is inclined from a disc radial direction, a pad falling-off preventive portion that is bent back so as to form a circular arc, the pad falling-off preventive portion extending outward from the inner receiving piece, and a side piece that connects the inner receiving piece and the outer receiving piece.

21. A disc brake for a vehicle as set forth in claim 20, wherein the elongated strip is longer than a distance by which ears of a friction pad are moved from a time when a lining of the friction pad is new to being fully worn.

22. A disc brake for a vehicle as set forth in claim 20, wherein the elongated strip is a spring back portion which is warned and extends outward between the inner receiving piece and the outer receiving piece.

* * * * *

UNITED STATES PATENT AND TRADEMARK OFFICE
CERTIFICATE OF CORRECTION

PATENT NO. : 7,219,773 B2
APPLICATION NO. : 10/759104
DATED : May 22, 2007
INVENTOR(S) : Ono

It is certified that error appears in the above-identified patent and that said Letters Patent is hereby corrected as shown below:

In column 10, line 48 (claim 2, line 6) of the printed patent, "a pad springing-hack portion" should be --a pad springing-back portion--.

In column 11, line 26 (claim 11, line 1) of the printed patent, "vehicle as set forth in claim 1, comprising:" should be --vehicle comprising:--.

In column 12, line 10 (claim 12, line 27) of the printed patent, change "axial direction:" to --axial direction;--.

In column 12, line 18 (claim 13, line 3) of the printed patent, "support anus" should be --support arms--.

In column 12, lines 37-38 (claim 12, lines 21-22) of the printed patent, "new to being frilly worn" should be --new to being fully worn--.

In column 13, lines 10-11 (claim 18, lines 18-19) of the printed patent, "new to being filly worn," should be --new to being fully worn,--.

In column 13, line 27 (claim 19, line 9) of the printed patent, "plate thereof the ears" should be --plate thereof, the ears--.

In column 14, line 38 (claim 22, line 3) of the printed patent, "warned and extends" should be --warped and extends--.

Signed and Sealed this

Seventeenth Day of June, 2008

JON W. DUDAS
*Director of the United States Patent and Trademark Office*